(12) United States Patent
Warbrick

(10) Patent No.: US 7,146,098 B1
(45) Date of Patent: Dec. 5, 2006

(54) OPTICAL PROTECTION SCHEME

(75) Inventor: Kevin Warbrick, Bishops Stortford (GB)

(73) Assignee: Nortel Networks Limited, St. Laurent (CA)

( * ) Notice: Subject to any disclaimer, the term of this patent is extended or adjusted under 35 U.S.C. 154(b) by 830 days.

(21) Appl. No.: 10/034,036

(22) Filed: Dec. 20, 2001

(51) Int. Cl.
  *H04B 10/00* (2006.01)

(52) U.S. Cl. .............................. 398/2; 398/17; 398/25

(58) Field of Classification Search .................... 398/4, 398/5, 26, 27, 33, 38, 10–15, 2, 17, 25
  See application file for complete search history.

(56) References Cited

U.S. PATENT DOCUMENTS 5,457,556 A * 10/1995 Shiragaki ...................... 398/50
5,825,516 A * 10/1998 Walsh ........................... 398/40
6,522,803 B1 * 2/2003 Nakajima et al. .............. 385/24
6,718,138 B1 * 4/2004 Sugawara ....................... 398/9
2003/0016410 A1 * 1/2003 Zhou et al. .................... 359/10

* cited by examiner

*Primary Examiner*—Christina Y. Leung
(74) *Attorney, Agent, or Firm*—Barnes & Thornburg LLP

(57) ABSTRACT

A method for triggering an optical protection event in an optical layer of a network comprising the following steps: i) monitoring the optical performance of an optical signal transmitted within the optical layer of the network; ii) provisioning optical protection in the event the monitored optical performance falls below a first threshold level; and iii) triggering an optical protection event, in the event the monitored optical performance falls further to below a second threshold level. The monitoring step is performed within the optical layer of the network by using a proxy to determine an optical performance characteristic which corresponds to the transmission quality of electronic signals extracted from said optical layer signal.

16 Claims, 10 Drawing Sheets

OPTICAL PROTECTION SCHEME

FIELD OF THE INVENTION

The present invention relates to an optical protection scheme, in particular to a method for triggering an optical protection event within the optical layer of a communications network, and to various related aspects.

BACKGROUND TO THE INVENTION

In recent years, communications networks have proliferated and become increasingly complex and difficult to manage. Whilst network management centres are able to implement most functions of network management in a centralised manner, centralised management is not practical whenever fast responses are required, such as responding to failures and setting up and down connections which may need to be done on relatively rapid timescales.

For functions which require actions to take place on such relatively rapid timescales, decentralised management can be used, which enables faster response times to failures, and enables large and complex networks to be more easily managed. Different domains of a networks may thus be managed by different, often autonomous, network controls, for example network operators, who have no visibility of the behaviour and performance characteristics of the network outside their own domain.

This partitioning of the network management can create problems. For example, it may no longer be possible for a network operator controlling the network elements and links at the optical network layer to assess how any optical degradation is affecting the quality of service provided in higher layers, for example in the client layer network's electronic domain.

Optical degradation can occur rapidly or slowly, and is particularly likely to occur when the photonic or all optical network layer of a communications network uses Dense Wavelength Division Multiplexing (DWDM), for example, when a new wavelength channel is injected into an optical link carrying an existing wavelength channel. Channels in a DWDM system are closer in wavelength than in systems using a simpler Wavelength Division Multiplexed transmission technique, and so are more likely to experience crosstalk related degradation due to the narrower margins provide between channels. (See FIG. 1 of the accompanying drawings for example, which shows how adjacent channels of wavelengths $\lambda_1$, $\lambda_2$ experience cross talk when their spectra overlap.)

The extent to which any degradation in the optical layer of a communications network is affecting the quality of the signals transmitted in a partitioned, client layer network (see for example, FIG. 2) is not easy to determine within the optical layer without reference to the client layer. Consequently, the extent to which optical degradation is affecting the signals transmission quality in the optical domain may not be initially apparent to a network operator who has visibility only of the optical network. In such cases, only when the degradation in the optical layer has fallen to such an extent that alarms are triggered in the client layer network will the optical layer network operator be informed that the problem exists and that action must be taken to restore the quality of service in the client layer network. This would constitute a non-compliance of the service level agreement between the network service provider and the network client.

In a transparent optical network, it is not possible to access overhead bits in transmitted data to obtain performance related data. Thus it is difficult to monitor bit error rate (BER) within the optical layer. Conventionally, transmission-related parameters that can be monitored include optical power levels, optical signal-to-noise ratios, temperature, electrical BER and various other parameters associated with the electronics present at transmitters optical amplifiers and receivers. Such parameters are then used by the network management system to provide guaranteed BER performance to the client layer network. However, such parameters cannot be determined at nodes where it is not possible to access the client layer network.

Conventional BER detection schemes typically assess BER in the electronic domain, and initiate action in the optical domain only when the electronic BER has exceeded a predetermined critical level. Usually, therefore if a network operator has no visibility of, and/or network management cannot monitor, the BER in the electronic domain, the quality of service in the electronic domain may be compromised before actions can be taken in the optical domain to remedy the situation.

US patent application co-filed herewith entitled "IMPROVED METHOD AND APPARATUS FOR MEASURING OPTICAL TRANSMISSION CHARACTERISTICS IN PHOTONIC NETWORKS", Nortel ref: 14780ID (hereinafter referred to as "copending application"), and incorporated into this application by reference, describes a technique which enables degradation in an optical link which results in distortion to be distinguished from degradation in the link which gives rise to noise. This technique thus enables a proxy for the electronic behavior in the client layer network to be provided within the optical layer network.

OBJECTS OF THE INVENTION

One object of the invention seeks to provide a method of triggering a protection event within the optical layer of a communications network in which a proxy for electronic transmission quality in a client layer network is used, to mitigate and/or obviate the above problems. The protection event is triggered to restore a degraded optical signal to a higher level of optical quality. The method of triggering the protection event does not rely on any indication being previously received from the client layer network of any degradation in the electronic domain before appropriate action is taken in the optical layer network.

Another object of the invention seeks to provide an improved method of detecting degradation in the optical layer of a communications network to mitigate and/or obviate the above problems by using a proxy for electronic transmission quality in a client layer network.

SUMMARY OF THE INVENTION

A first aspect of the invention seeks to provide a method for triggering an optical protection event in an optical layer of a network comprising the following steps:

i) monitoring the optical performance of an optical signal transmitted within the optical layer of the network;

ii) provisioning optical protection in the event the monitored optical performance falls below a first threshold level; and iii) triggering an optical protection action, in the event the monitored optical performance falls further to below a second threshold level, wherein the monitoring step is performed within the optical layer of the network by using a proxy to determine an optical performance characteristic which corresponds to the transmission quality of electronic signals extracted from said optical layer signal.

Preferably, the optical performance characteristic is derived from the Q value acquired at the source and destination nodes of said optical signal.

Preferably, the optical performance characteristic is derived from the Q value acquired between pairs of nodes along the transmission path of said optical signal.

Preferably, said first predetermined level of said optical performance is set such that the service quality derived from the transmission quality of electronic signals extracted from said optical layer signal is not affected when said level is exceeded.

Preferably, said second predetermined level of said optical performance is set such that the service quality derived from the transmission quality of electronic signals extracted from said optical layer signal is about to be affected when said level is exceeded.

Preferably, the monitoring step is performed whenever a new channel is injected into said optical layer of said communications network.

Advantageously, the above methods prevent any performance degradation within the optical layer network affecting the performance provided from within the client layer network's electronic domain.

Advantageously the first and second predetermined levels may be chosen to be equal thus providing an unprotected but restorable optical path Advantageously, the above methods provide a feedback mechanism for network elements to indicate problems occurring in the optical layer which enables an assessment to be made of the impact optical degradation will have in the client (electronic) domain. By enabling the impact made by any individual additional λ, feedback to the network management can be provided which enables appropriate action to be taken within the optical domain before it adversely affects the client layer network signals.

A second aspect of the invention seeks to provide a method of indicating to network control when degradation in the performance in an optical layer of a communications network has occurred prior to the performance in any higher layers of said communications network being substantially adversely affected, the method comprising the steps of:

i) monitoring the optical performance of an optical signal transmitted within the optical layer of a network using a proxy to determine an optical performance characteristic which corresponds to the transmission quality of electronic signals extracted from said optical layer signal; and ii) generating a first alarm in the event that the optical performance falls below a first predetermined optical performance level to alert the network control of said network that said first predetermined optical performance level has been exceeded.

Preferably, said network control comprises a network operator.

Alternatively, said network control comprises an autonomous network controller.

Preferably, the method of the second aspect further comprises the steps of iii) said network control provisioning optical protection in the event the monitored optical performance falls below the first threshold level.

Preferably, the method of the second aspect further comprises the steps of iv) triggering an optical protection event, in the event the monitored optical performance falls further to below a second threshold level.

Preferably, the method of the second aspect further comprises the steps of iii) said network control provisioning optical protection in the event the monitored optical performance below the first threshold level, wherein said optical protection provides end-to-end path protection.

Alternatively, the method of the second aspect further comprises the steps of iii) said network control provisioning optical protection in the event the monitored optical performance falls below the first threshold level, wherein said optical protection provides local link protection.

Advantageously, the above methods enable action to be taken in the optical domain before the BER in the electronic domain has fallen to a level in which the quality of service is compromised and/or an alarm is triggered.

Advantageously, the threshold for a performance or equivalently a quality of service (QoS) alarm in the optical domain can be set independently of the performance/QoS alarm in the electronic domain of the network.

Advantageously, it is possible to not have a 1:1 correspondence between the optical and electronic domains it is possible to monitor optically independent of the client network.

A third aspect of the invention seeks to provide a protection scheme for an optical network, wherein the optical performance of an optical path in the optical network is indicated to a network operator using the method of the second aspect.

A fourth aspect of the invention seeks to provide apparatus for use in a communications network, the network element capable of implementing a method of indicating to network control when degradation in the performance in an optical layer of the communications network has occurred prior to the performance in any higher layers of the communications network being substantially adversely affected, the apparatus comprising the steps of:

i) a monitor arranged to monitor the optical performance of an optical signal transmitted within the optical layer of a network using a proxy to determine an optical performance characteristic which corresponds to the transmission quality of electronic signals extracted from said optical layer signal; and ii) an alarm generator arranged to generate a first alarm in the event that the optical performance falls below a first predetermined optical performance level to alert the network control of said network that said first predetermined optical performance level has been exceeded.

Preferably, said apparatus further comprises:
means for said network control to provision optical protection in the event the monitored optical performance falls below the first threshold level.

A fifth aspect of the invention seeks to provide an optical protection system comprising a plurality of apparatus as claimed in the fourth aspect and/or preferred features and arranged to provide an optical protection system implementing the method of the first or second aspects and/or preferred feature(s).

A sixth aspect of the invention seeks to provide an optical alarm signal indicating that an optical parameter in an optical network has fallen below a first predetermined level as provided in the method of the first or second aspects and/or preferred feature(s).

A seventh aspect of the invention seeks to provide an optical alarm signal indicating that an optical parameter in an optical network has fallen below a second predetermined level as provided in the method of the first aspect and/or preferred features or second aspect and preferred features.

An eighth aspect of the invention seeks to provide a communications network in which the optical layer is provided with means to implement the method of either the first or second aspects and/or preferred features.

The preferred features may be combined as appropriate, as would be apparent to a skilled person, and may be combined with any of the aspects of the invention.

The invention also includes apparatus for carrying out the method steps of the first and second aspects and/or preferred features.

The invention also provides for a system for the purposes of communications which comprises one or more instances of apparatus embodying the present invention, together with other additional apparatus.

Advantageously, the above methods can be adapted to suit the requirements of individual clients. Thus if a customer does not want a sophisticated service and only requires a basic service, the thresholds can be adjusted within the optical domain. Thus the network operator can choose to define thresholds at which restoration is to take place. The network operator can choose to use the pre-emption time to lay down protection paths/implement a protection link to circumvent a potential problem. The network operator is also able to identify what links are available for restoration and provision them in sufficient time. The restoration scheme according to the invention can thus be implemented on both end-to-end paths, end-to-end cycles or locally at the path link level.

Advantageously, it is possible to trigger an initial alarm to ensure protection is set up in anticipation that the degradation may get worse, which is useful where the quality of service is degrading is slowly as the optical transmission deteriorates.

Advantageously, the optical protection can be implemented within the optical layer before the client layer network is adversely affected.

Advantageously, the system can indicate to a network operator via a simple graphical display the optically deteriorating links prior to the client layer links being degraded to the extent where BER alarms are triggered in the client layer.

Advantageously, in this way, a higher quality of service can be maintained in the client layer as pre-emptive action can take place within the optical domain to ensure a consistent quality of service is provided in the client layer network.

Advantageously, a network operator may configure an initial alarm threshold in the optical layer network.

Advantageously, a network operator may be warned as the optical degradation approaches the threshold values.

Advantageously, this enables a network operator to provide dynamic contingency protection for paths which are vulnerable to optical degradation, which is not possible when no indication is provided of how close an optical link is to reaching a point where optical degradation will impact the client layer network adversely.

Advantageously, a high level of transparency can be supported within the optical layer network, whereas conventionally, the assessment of Bit Error Rates in the client layer network(s) requires traffic to be converted from its optical layer form into electronic form. Conventional methods thus have several disadvantages in that they reduce the transparency of the network and requires costly equipment for the conversion stages.

The invention assesses degradation of the optical transmission quality within the optical layer directly. By using the technique described in copending application, a proxy can be provided for the electronic behaviour, as the degradation in optical transmission quality which impacts the electronic BER can be determined.

Conventional photonic network protection schemes involve providing redundant capacity with the network which is used to reroute traffic in the presence of failures. Some preferred embodiments of the invention could enable the level of redundancy to be reduced in future.

Conventionally, it is necessary to perform extensive simulation tests before additional wavelengths are provided in an optical communications network to ensure the additional wavelength(s) do not adversely affect existing transmission wavelengths. As networks evolve, more flexible mechanisms are required to satisfy customer demand and to cope with the increasing numbers of wavelengths and network elements provided along any given light path. Advantageously, the inventions seeks to provide a way to enable channels to be provided in a more flexible manner at the optical layers of the network without impacting the performance of higher layer client networks.

BRIEF DESCRIPTION OF THE DRAWINGS

In order to show how the invention may be carried into effect, embodiments of the invention are now described below by way of example only and with reference to the accompanying figures in which.

DETAILED DESCRIPTION OF INVENTION

Any range or device value given herein may be extended or altered without losing the effect sought, as will be apparent to the skilled person for an understanding of the teachings herein. The best mode of the invention as apparent to the inventor will now be described with reference to the accompanying drawings.

Figure 1:
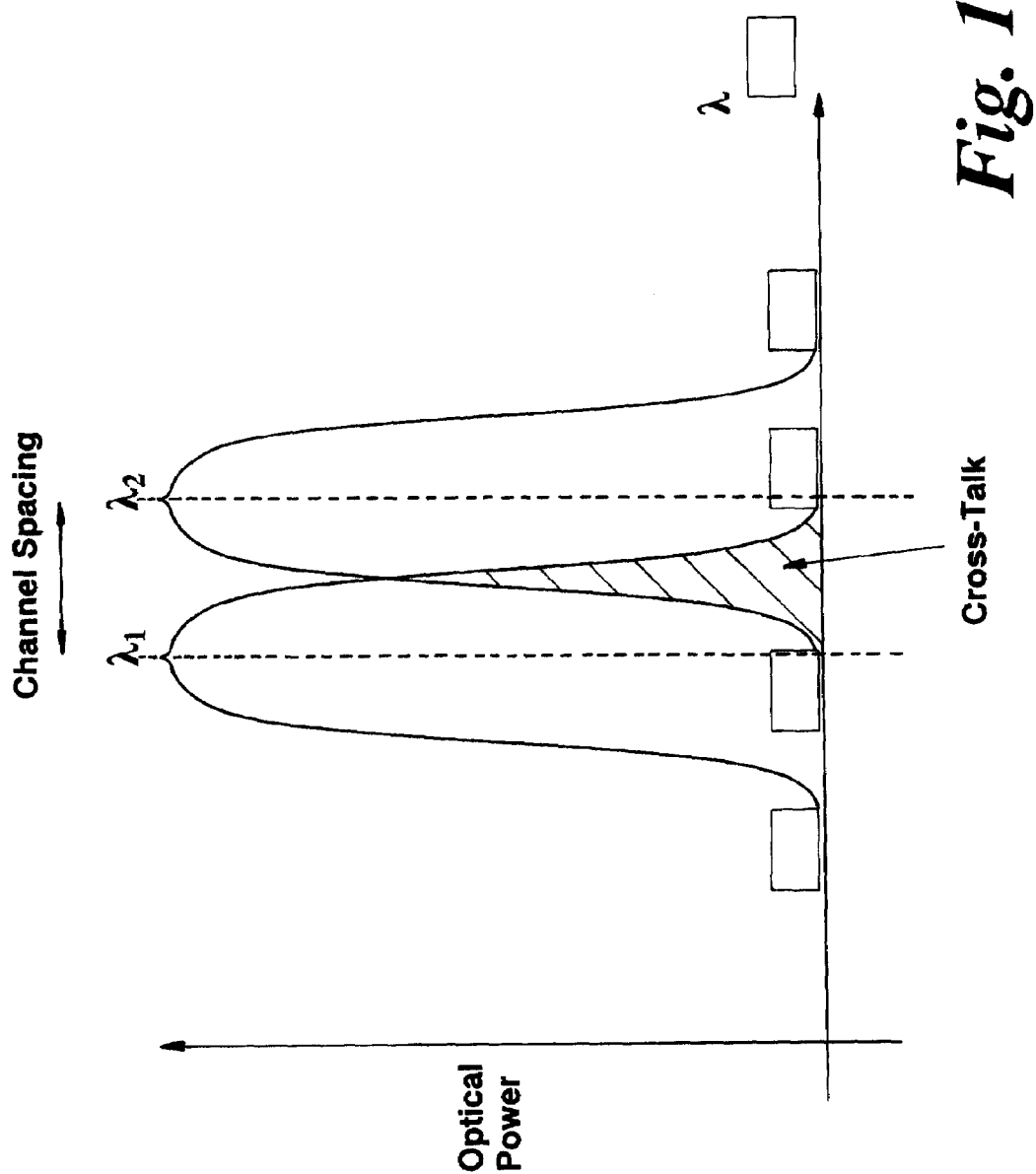
FIG. 1 shows schematically cross-talk between adjacent wavelength channels.
Figure 2:
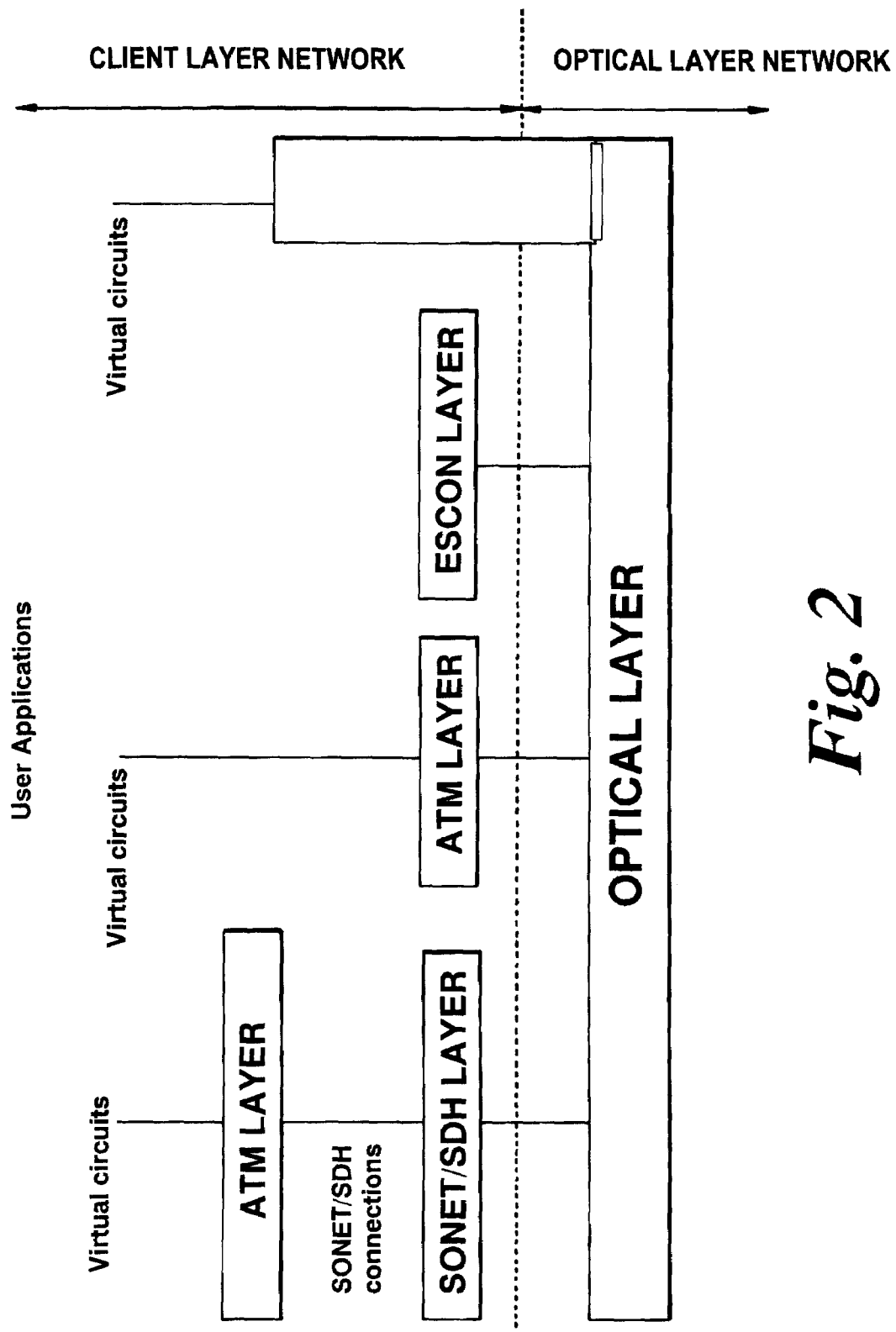
FIG. 2 shows schematically some examples of higher layer networks supported by an optical layer network.

FIG. 1 of the accompanying drawings shows schematically how channels provided in an optical layer network, where traffic is wavelength division multiplexed, may experience cross-talk if the channel margins become too narrow. In FIG. 1, a first channel $\lambda_1$, and a second channel $\lambda_2$ are separated by a narrow wavelength band or channel margin. Irregularities in transmission media, or regenerative processes, filtering etc., may all cause distortion of the channels. Chromatic distortion which broadens the channels can generated significant cross-talk, which leads to transmission errors being detected when the optical signals are converted into electronic signals at node equipment interfacing with higher, client layers which operate in the electronic domain, such as FIG. 2 shows.

The term optical layer is used herein to denote the functionality of a WDM or DWDM optical network providing light paths to client signals. While the optical layer supports point-to-point WDM links and add/drop functions, it resides under higher layers, such as the Synchronous Digital Hierarchy (SDH) Synchronous Optical Network (SONET), Asynchronous Transfer Mode, ESCON layers, collectively referred to herein as "client layer networks" (see FIG. 2). The term photonic layer and optical layer are used within this document interchangeably to indicate a wavelength transmission division transmission layer within a communications network, as is apparent to those skilled in the art. In an optical WDM or DWDM network, path protection is provided at the optical channel layer, whereas line and span protection belong to the optical multiplex layer. Depending on context, the term "optical layer" as used herein may refer to the optical channel layer and extend to include the optical multiplex layer of an optical network as is apparent to those skilled in the art.

Figure 3:
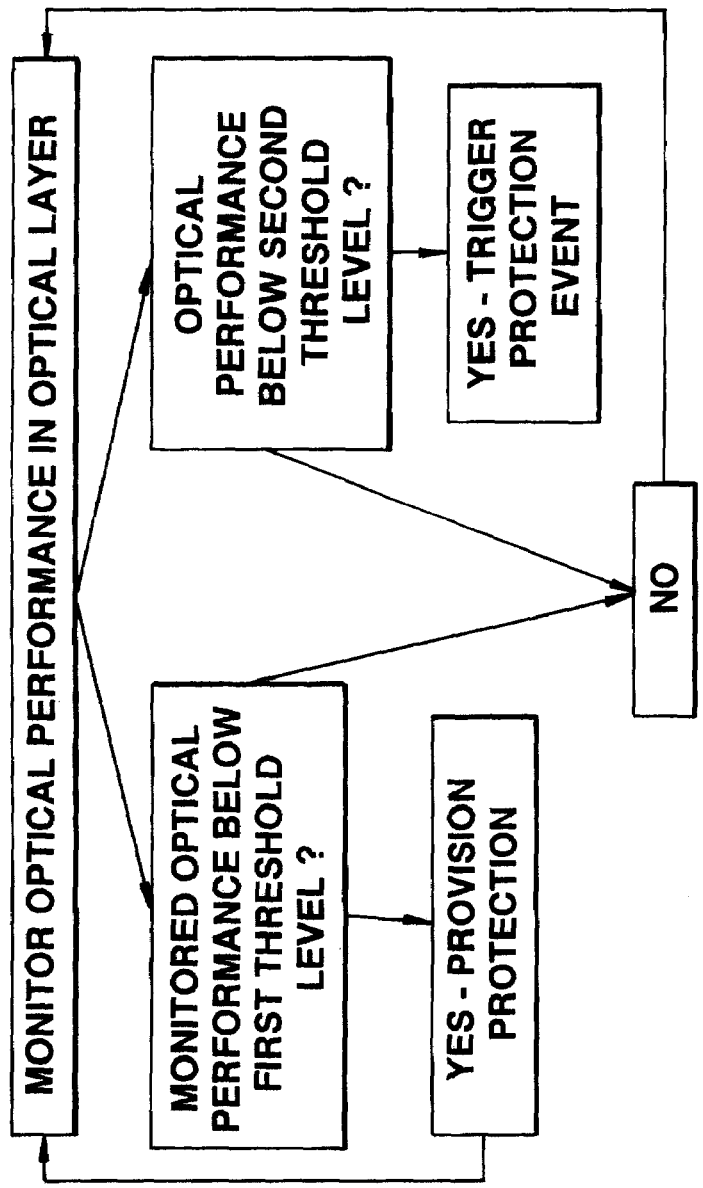
FIG. 3 shows schematically steps in a method to trigger an optical layer protection event according to a first embodiment of the invention.

Referring now to FIG. 3, a method of triggering an optical protection event within the optical layer of a communications network independently of the transmission performance in higher layers is shown. It is assumed that the optical layer of the network has a number of reconfigurable optical flexibility points, for example, such as photonic cross-connects (PXCs) and/or flexible optical add-drop multiplexers (FOADM's). The traffic patterns are assumed to be dynamic on the network (for example, new channels can be added and existing channels dropped such as is shown by $\lambda_2$ in FIG. 4A, which is described in more detail later herein below). The invention further requires at least two nodes along an optical path to be capable of optical performance monitoring and to have the ability to gather metrics such as optical signal-to-noise ratio and channel Q in according with the techniques described in copending application.

The method of triggering an optical protection event comprises the following steps:

i) the optical performance of an optical signal transmitted within the optical layer of a network is monitored. The monitoring step is performed within the optical layer of the network using a proxy to determine those components of the optical performance with can affect the transmission quality of the equivalent electronic signal;

ii) in the event the monitored optical performance falls below a first threshold level, suitable optical protection is provisioned; and iii) in the event the monitored optical performance falls further, to below a second threshold level, an optical protection event is triggered.

Optical protection to be provisioned in a number of ways. Both end to end path and local line protection are supported. Advantageously, by responding dynamically to changing network conditions, additional protection can be provide in the event a first protection event has already been triggered (see FIGS. 6B, and 6C described in more detail herein below).

End to End Path Protection

End-to-end path protection is provided by path switching where the source and destination of each individual traffic stream handles the restoration of traffic. In end-to-end protection systems traffic is rerouted at the source and destination nodes in the event of a failure somewhere along the route between the two nodes (see for example, FIG. 4A which is described in more detail herein below).

Local Protection

Local protection can be implemented as span protection or line protection. Where local protection is provided, the restoration of traffic is handled by the nodes at the ends of a failed link. Line protection provides a diversely routed protection path between the two nodes at the ends of a failed link (see for example FIG. 5B, which is described in more detail herein below), whereas span protection provides redundant bandwidth along a fibre between the same two nodes as the working path (see FIG. 4B).

Pre-Emptive Protection Scheme

As described above, a first embodiment of the invention provides a method for triggering an optical protection event for an optical signal propagating in a communications network. The communications network comprises at least one client network in which electronic signals propagate and a supporting optical layer network, in which wavelength division multiplexed signals propagate. For example, a client layer network may be a SONET or SDH network. Optical signals which support the electronic signals (i.e., the optical equivalent to the electronic signals) are transmitted over the optical layer network. The optical layer network thus supports the higher, client layer network. Examples of suitable optical layer networks include WDM and DWDM networks.

The method requires the provision of suitable equipment which enables an optical performance characteristic to be determined, so that an assessment can be made, either automatically or with some degree of intervention, as to when to trigger an optical protection event. The optical protection event is triggered when it is desirable to restore the monitored optical transmission performance characteristic to above a predetermined level of acceptable performance in the optical network.

The restoration is triggered according to the best mode of the invention independently of the performance of a corresponding performance characteristic of the electronic equivalent of the optical signal provided in a higher client layer of the network. Thus, for example, the BER error a SONET/SDH connection need not have been affected by any degradation in the optical layer before the protection event in the optical layer is triggered. Ideally, according to the best mode of the invention, the triggering of a protection path occurs before performance in the higher client layer has been adversely affected by the degradation at the lower, optical layer.

End-to-End Path Protection

Figure 4A:
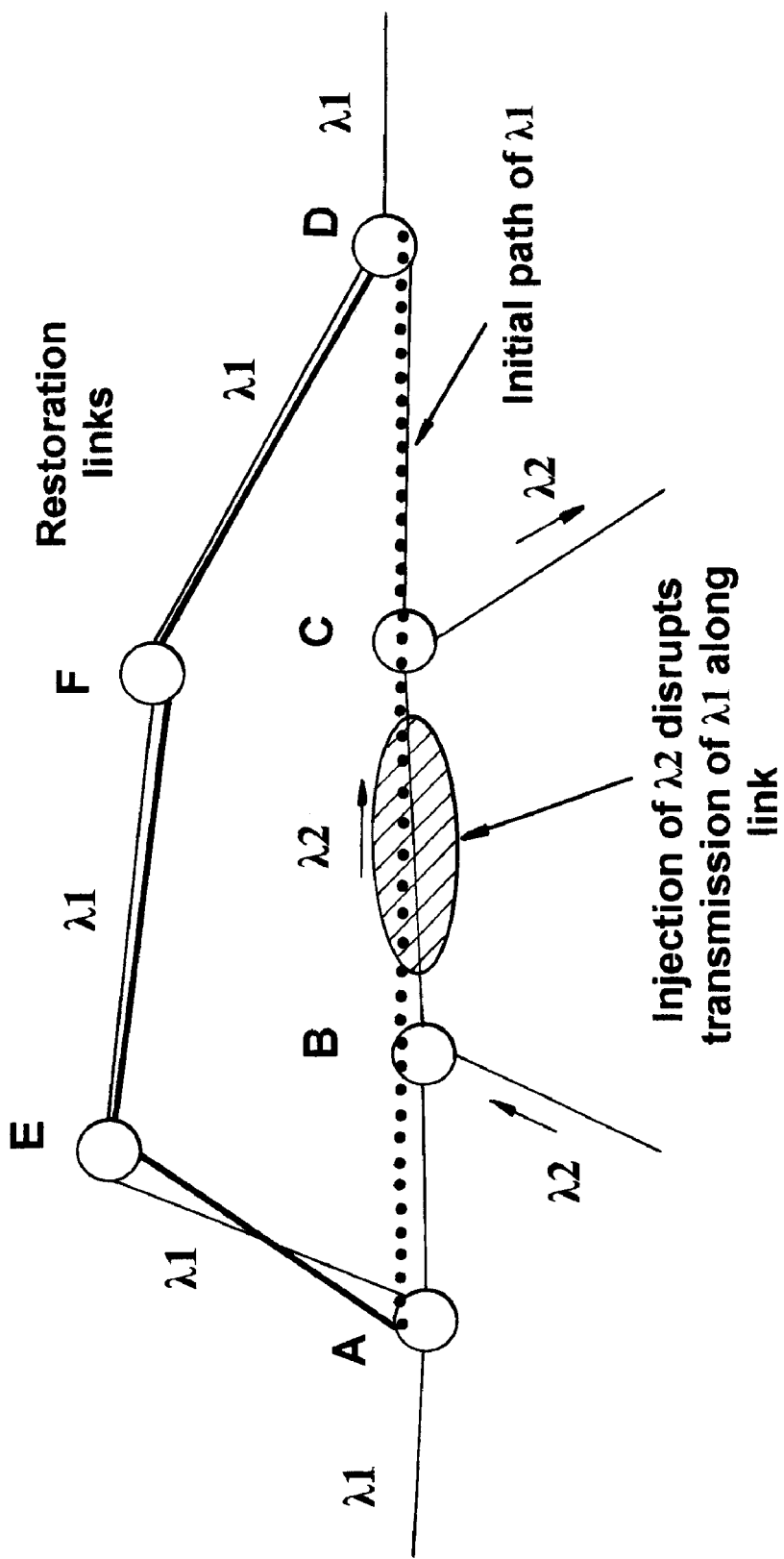
FIG. 4A shows schematically a second embodiment of the invention in which the method of FIG. 3 is used to trigger a diverse path protection event.

Referring now to the network shown in FIG. 4A, an all optical or photonic network is shown which has a number of reconfigurable optical flexibility points, for example, such as photonic cross-connects (PXCs) and/or flexible optical add-drop multiplexers (FOADMs) A, B, C, D, E, F. The traffic patterns in this network are assumed to be dynamic (for example, a new channel can be added/dropped such as is shown by $\lambda_2$). The invention assumes that at least two nodes along an optical path are capable of optical performance monitoring and have the ability to gather metrics such as optical signal-to-noise ratio and channel Q (such as copending application describes).

In FIG. 4A, an existing wavelength channel $\lambda_1$ is provided between nodes A and D via nodes B and C. The wavelength path of channel $\lambda_1$ has already been accepted by the network and has a performance metric above a first threshold level $T_1$ to ensure error free operation and some operating margin.

As the network changes its configuration in response to dynamic traffic demands, for example, by the injection of the new channel wavelength $\lambda_2$ (see FIG. 4A), the existing path performance may be degraded or equipment fault issues may degrade a path over time to below the high threshold level. These changes in optical performance are reflected in the optical performance metrics monitored.

For example, if the new channel wavelength is adjacent to an existing channel wavelength, cross-talk between the two channels $\lambda_1$, $\lambda_2$ can generate errors which cause transmission quality to deteriorate along the path shared by the two channels (see FIG. 1).

According to the invention, at a first low threshold value, the optical path, although supporting error-free transmission within the client layer, is at risk of further degradation which could then cause errors in the client layer. This triggers a first signal to the control plane which enables the control plane to identify the location of the degradation, the "at risk working path" between nodes B and C. This enables the control plane to provision a "bridge" protection path along nodes A, E,F, D in FIG. 4A. The "bridge" protection path is capable of restoring the performance metric(s) of the optical channel $\lambda_1$ to an acceptable level, e.g. their previous level.

In the event that the degradation of the optical transmission of channel $\lambda_1$ begins to approach a certain critical level, for example, if the client layer network residing at layers above the optical layer of the communication network begins to approach a performance level which indicates a loss of service may shortly follow, $\lambda_1$ can be re-routed along the bridge protection path.

The client data service is simply "rolled" on to the new path to ensure reliability of service without any disruption at the client layer occurring. The original path ABCD can be deleted to free network resources, and any fault isolated can be repaired by the network. Thus, in the event $\lambda_2$ impacts $\lambda_1$ along long the link between B and C such as is shown in FIG. 4A, $\lambda_1$ can be restored by rerouting $\lambda_1$ along nodes A,E,F, D by implementing techniques which are known to those skilled in the art, and those restoration techniques can be triggered by the method according to the invention.

Local Span Protection

Figure 4B:
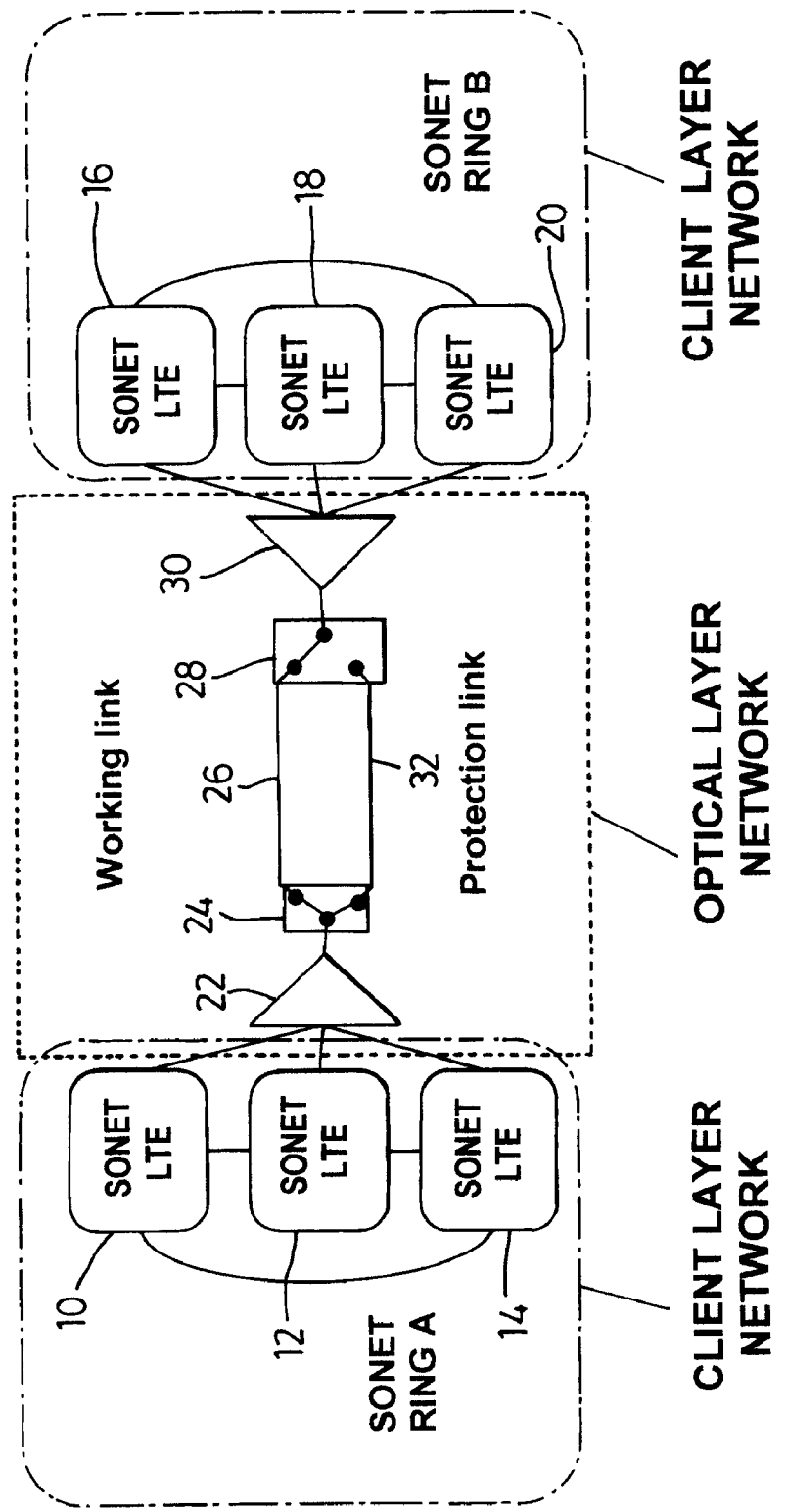
FIG. 4B shows schematically a third embodiment of the invention which illustrates how the method of FIG. 3 may be used to trigger a span protection event.

FIG. 4B shows two client layer networks, for example SONET rings, A, B which are linked together. Ring A comprises a first group of line terminal equipment (SONET LTEs) 10, 12, 14 which are connected to ring B (comprising a second group of SONET LTEs 16, 18, 20) via the optical layer. Optical layer apparatus includes a multiplexer (MUX) 22, bridge 24, working WDM link 26, switch 28 and MUX 30. In the event of sufficient degradation in one of the optical channels following path 26, indicated by the dashed line, a protection event can be initiated so switch 28 rolls the degraded channel over to protection link 32. In the embodiment of the invention shown in FIG. 3B, therefore, the protection event triggers a roll-over between working and protection paths between the same two nodes (MUXs 22, 30).

Local Line Protection

Figure 5A:
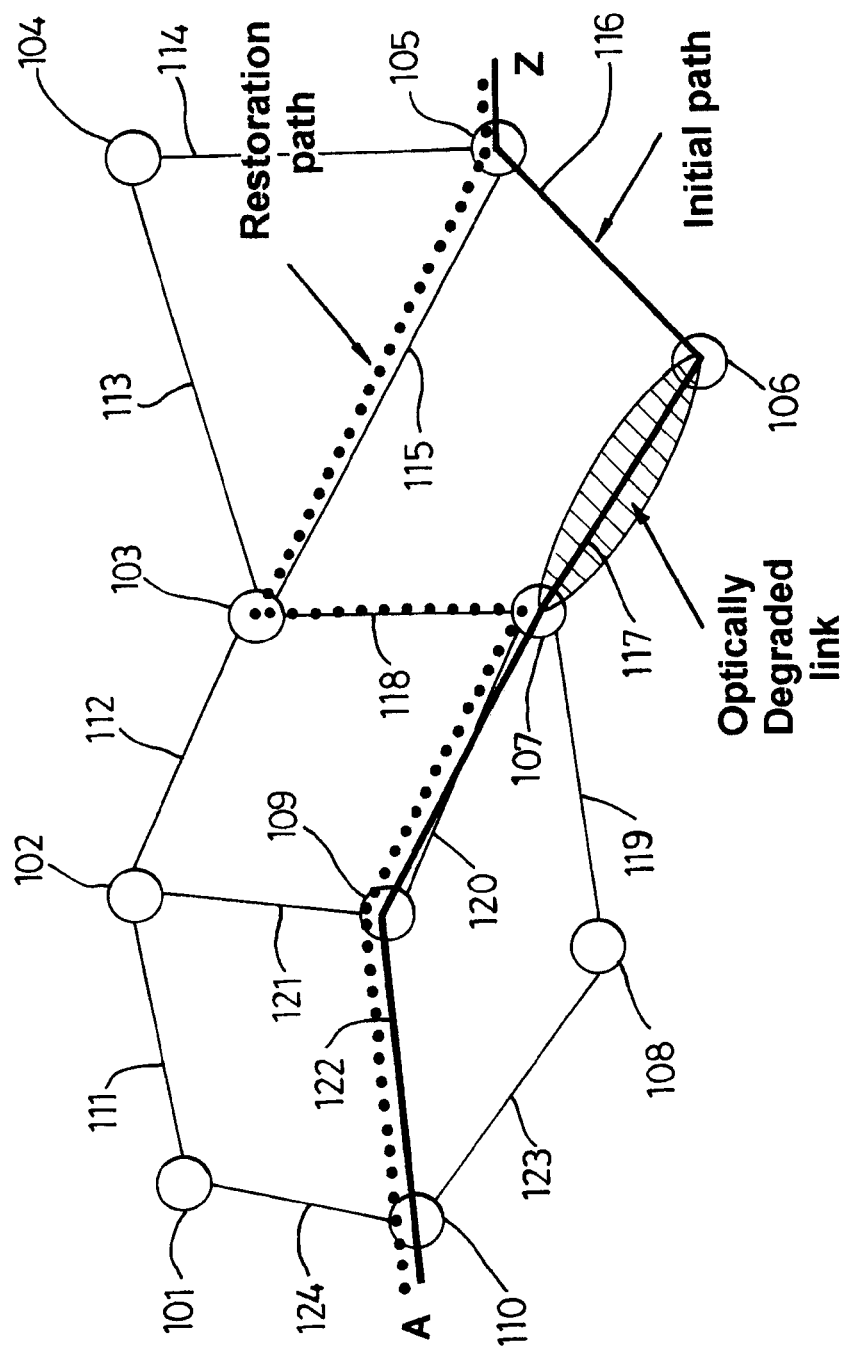
FIG. 5A shows schematically a forth embodiment of the invention which illustrates how the method of FIG. 3 may be used to trigger a protection event providing end-to-end path restoration in the optical layer of a communications network.
Figure 5B:
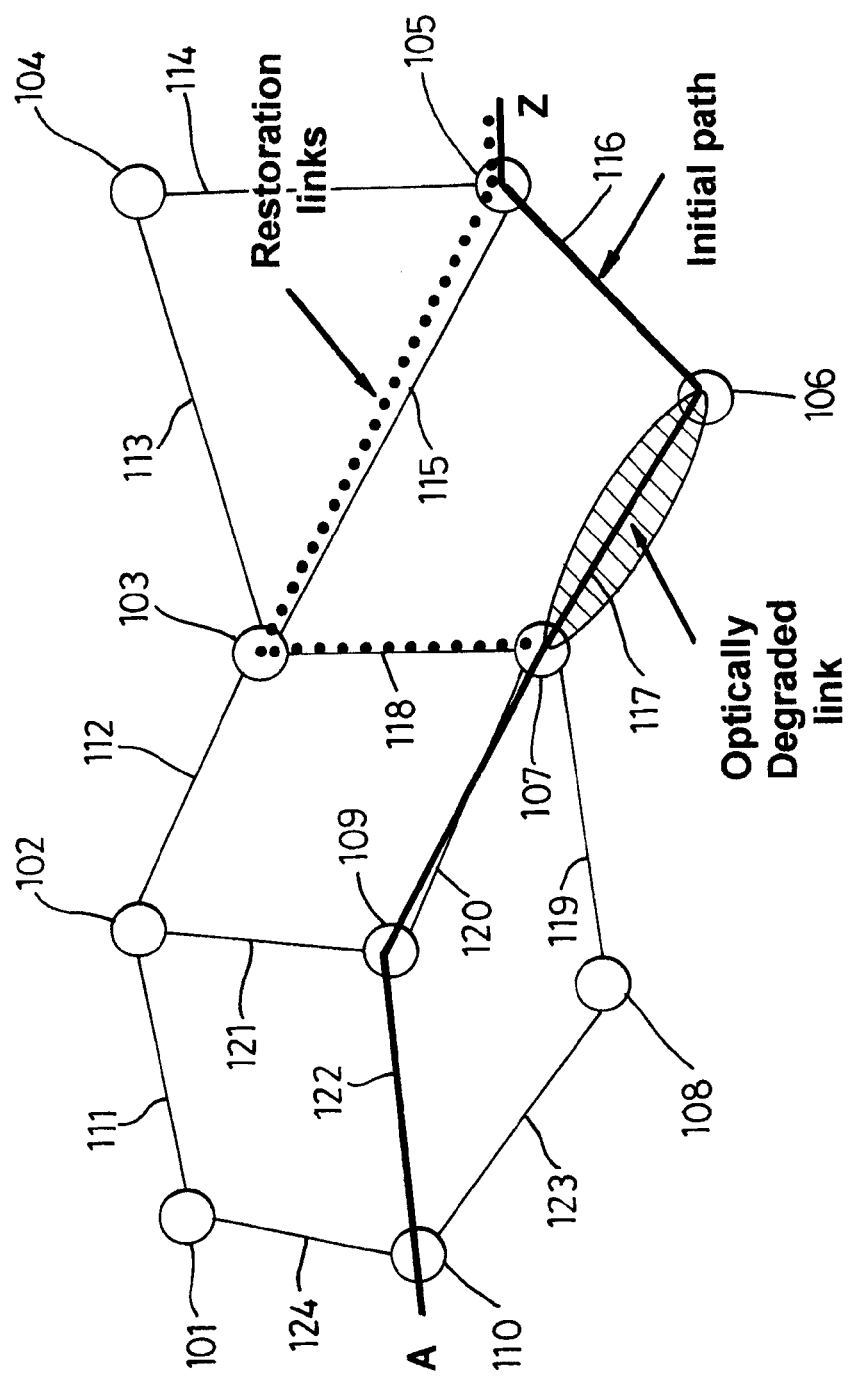
FIG. 5B shows schematically a fifth embodiment of the invention which illustrates how the method of FIG. 3 may be used to trigger a protection event providing line protection locally in the optical layer of a communications network.

In contrast, where local line protection is provided the traffic is switched through to another route through the network between the same two nodes (see FIG. 5B for example). If thus in a ring network, line protection routes traffic the other way around the ring in the event a link in the ring fails (not shown).

Advantageously, therefore, by using the technique described in copending application, the invention enables protection events to be triggered exclusively on the basis of performance metrics derived within the optical layer of the network, without the requirement for each intermediate node along a transmission path in the optical layer network to have the means to interface with the higher client layers. This enables optical protection to be provided pre-emptively, before the higher client layer(s) is(are) affected. The invention also enables protection to be provided without the network control supporting the optical layer of the network requiring means to interface with higher layers at each node in the network.

Alarms to trigger protection can thus be generated in a self-contained manner within the optical network to ensure service standards are maintained within the client layer networks. In particular, protection events can be triggered in the optical layer before any disruption or drop in service occurs in the client layer network.

According to the invention, a proxy for the behaviour in the electronic domain is provided by extracting the signal Q (the optical equivalent to BER) from the electronic domain at each NE (as equipment is shared, multiple ports can be monitored) as is described in copending application. The transmission output power is then tracked along a path and as the power degrades the receiver sensitivity limit is approached. The power sensitivity limit increases (i.e. the power margin) increases. By monitoring the Q in this way, the light paths (or channels) can be made as robust as possible.

The Q can be used in the same way as a true proxy for BER. Thus in some embodiments of the invention a 1:1 correspondence between Q and the electronic BER can be provided such that if the electronic BER=$10^{-6}$, then Q=$10^{-8}$. However, advantageously, the invention enables the Q monitoring thresholds to be determined and used independently of the electronic BER. (i.e., the 1:1 correspondence between the electronic BER and the optical Q can be removed). This is particularly advantageous as not all client network signals have the ability to monitor their BER.

Other embodiments of the invention will now be referred to in more detail with reference to FIGS. 5A, 5B, 6A, 6B, 6C to 7 of the accompanying drawings. These figures illustrate various scenarios in which the method of the invention may be used to trigger appropriate protection events.

Like components have consistent numbering in each of FIGS. 5A, 5B, 6A, 6B, and 6C. These figures collectively show an optical layer of a communications network in which each node 101 to 110 is assumed to have optical transmission monitoring equipment to detect degradation by monitoring performance, such as is described in copending application, by suitably monitoring feedback given to the control plane on the performance of each optical link.

Referring now to FIG. 5A of the accompanying drawings, a communication network is shown comprising nodes 101–110 connected by links 111–124. In FIG. 5A, a first optical communications path (A to Z) is shown with a thick solid line from node 110 to node 105 via nodes 109, 107, 106 and following links 122, 120, 117, 116. In FIG. 5A, only the source node 110 and destination node 105 have visibility of electronic domain performance characteristics. The remaining nodes have visibility of optical domain performance characteristics only within the optical layer(s) of the network.

In the embodiment shown in FIG. 5A, the control plane will monitor the performance parameters sampled at a first node $P_N$ (for example, node 109) and store this for comparison with the same performance parameter sampled at a later sampling time. At least one performance parameter $P_n$ will be derived from the electronic proxy determined by the Q value measurement obtained using the techniques and apparatus described in copending application.

Any significant difference $\delta P$ indicates a performance change has occurred between the two sampling times at this point, thus if $\delta P = P_{N(t2)} - P_{N(t1)} < 0$ this provides an indication that degradation in the optical link has occurred at some point between the node and the source. The link, node or links and nodes responsible for the degradation can be found by comparison of the performance parameters visible to the control plane As an example, comparison of performance parameters, $\Delta P$, between nodes 109 and 107 should provide a value which represents no degradation in the quality of transmission. In contrast, comparison between nodes 107 and 106 would indicate that degradation has taken place, the parameters at 106 having decreased significantly whilst those at 107 have not. If the performance parameter comparison falls below the first level, then the network control is suitably alerted and suitable protection is provisioned. If the performance parameter comparison falls to below a second level, then the network control is suitably alerted and a suitable protection event occurs.

The performance parameters on path 106-105 will also have changed, due to the upstream degradation, however the comparison between the parameters should not have changed. Thus no control plane action is taken at the upstream node. In FIG. 5A, end-to-end path reconfiguration is provisioned within the optical layer when the first threshold value for $\Delta P$ is exceeded at any point on the path. This provisioning occurs independently of whether a rise in the BER can be in the equivalent electronic domain. In contrast, in FIG. 5B local link protection is provisioned when the first threshold value for the localised $\Delta P$ between 106 and 107 falls below the first threshold value.

In the embodiments illustrated in FIGS. 5A and 5B, the control plane is signalled by downstream nodes when degradation has been detected as having fallen past a threshold, i.e., nodes 106, 105 will detect degradation in the event that link 117 is optically degraded beyond a certain point. The control plane then calculates where the fault has occurred as no "upstream" optical degradation will have occurred at nodes 110, 109, 107 etc. This calculation is performed locally and the results are passed to the control plane where the appropriate alarms may be raised and any network response initialled. Any changes in the network are signalled to all other nodes in the network, as the control plane is distributed over the network.

Another advantage of the invention is that whereas conventionally if a wavelength fails along a path the service normally also fails, the invention enables a protection to be provisioned as a precaution and held in readiness should it be required without unnecessary wastage of bandwidth. Thus the invention enables protection to be dynamically configured if sufficient bandwidth is available, and for further protection to be provided in the event that a protection event has already occurred but where the new working path itself is experiencing degradation. Provisioning such further protection paths is only feasible if performed dynamically as otherwise the amount of reserved bandwidth would be unacceptable.

Figure 6A:
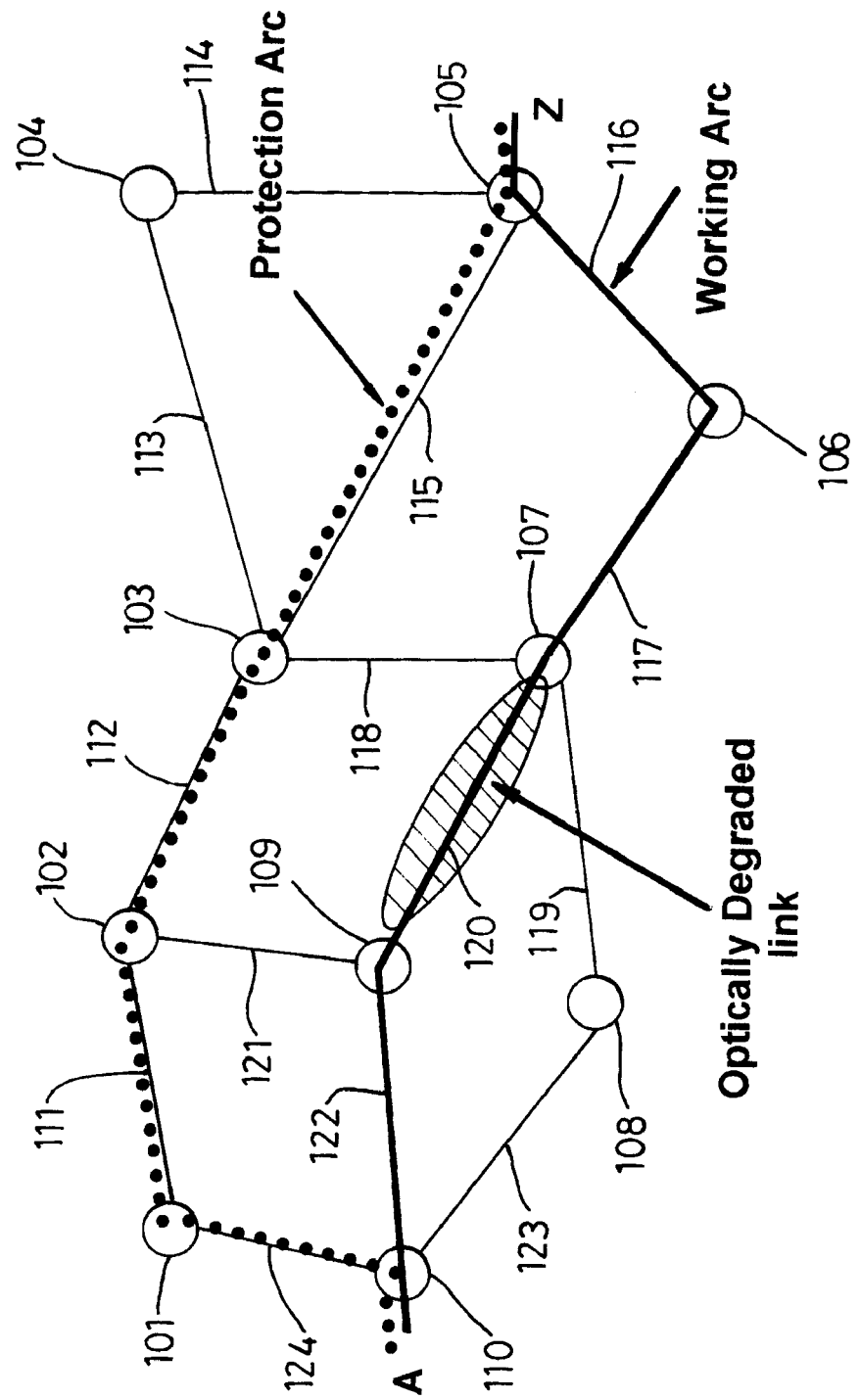
FIG. 6A shows schematically a sixth embodiment of the invention, which illustrates how the method of FIG. 3 may be used to trigger a protection event providing end-to-end link diverse path restoration in the optical layer of a communication network.

FIG. 6A shows another embodiment of the invention, in which the first optical path lies between nodes 110 and 105, via nodes 109, 107, 106. In FIG. 5, link 102 is optically degraded. Protection is now provided in accordance with the method of the invention via nodes 101, 102, 103, such that diverse end-to-end protection for the working path is provided.

Figure 6B:
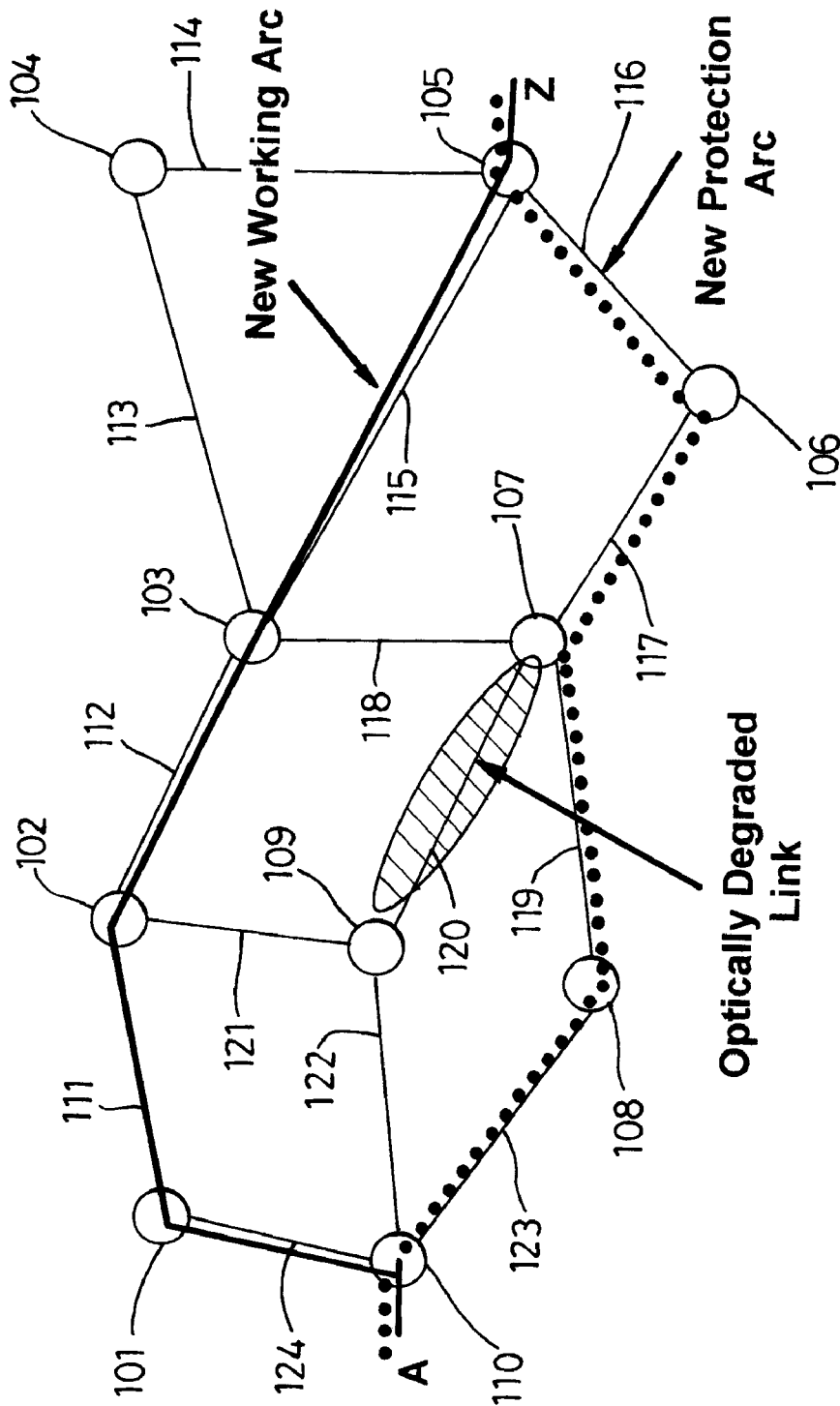
FIG. 6B shows schematically how the protection path provisioned by the protection event triggered in the embodiment shown in FIG. 6A may be provided with further end-to-end path protection which may be triggered according to a seventh embodiment of the invention.

In the event that a protection event is triggered, the path along nodes 110, 101, 102, 103, 105 becomes the working path. FIG. 6B illustrates an example where a second end-to-end protection path is provisioned via nodes 110, 108, 107, 106, 105. This second protection path is provisioned in the event the first protection path fails, which may occur either before protection is provided to working path 110, 109, 107, 106, 105 or after protection is provided.

Figure 6C:
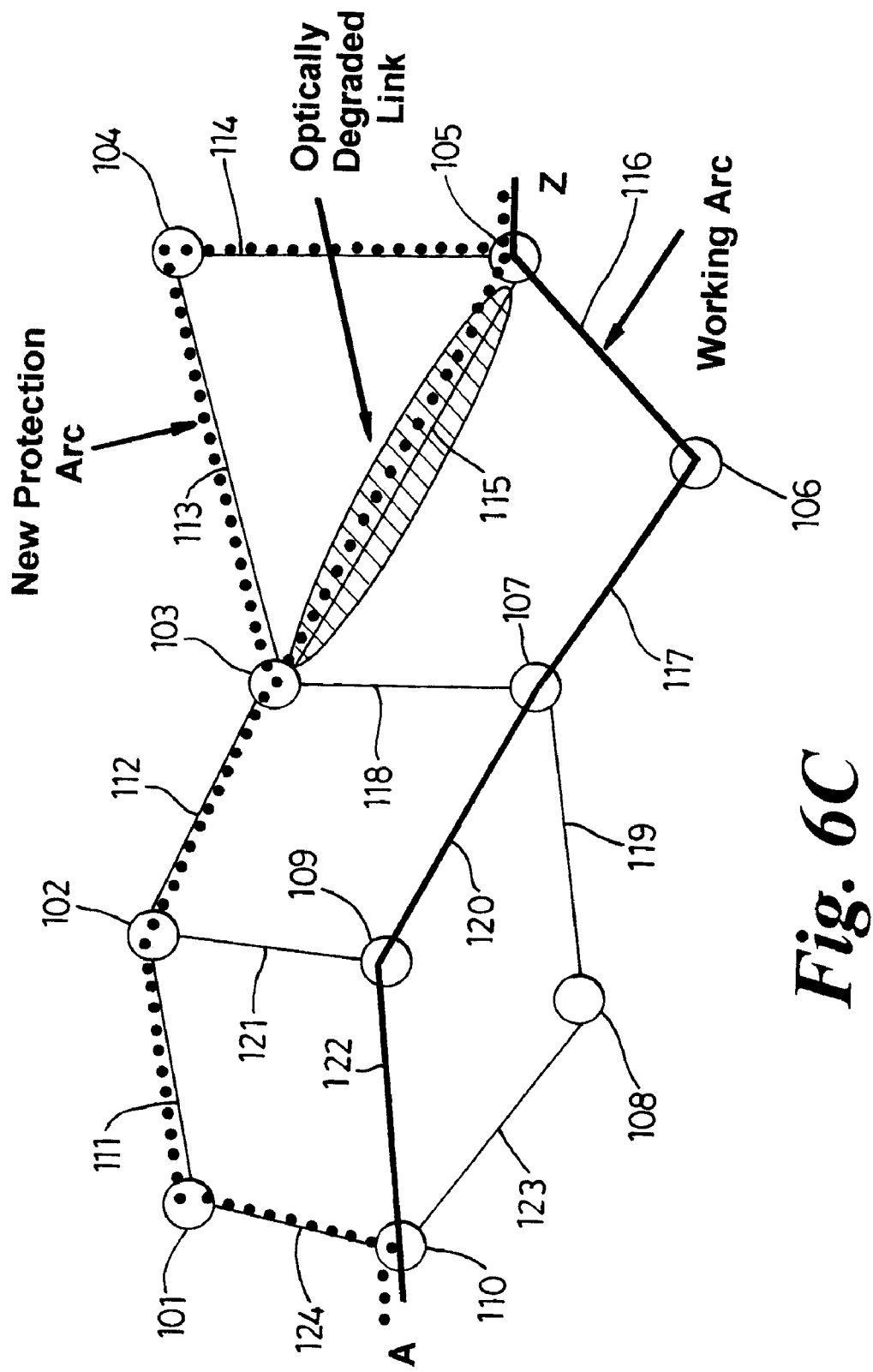
FIG. 6C shows schematically how the protection path provisioned by the protection event triggered in the embodiment shown in FIG. 6A may be provided with further local line protection with may be triggered according to an eighth embodiment of the invention.

If the first protection path shown in FIG. 6A itself becomes optically degraded, such as is shown in FIG. 6c, where link 115 has become optically degraded, a local protection arc may be further provisioned via nodes 103, 104, 105.

Advantageously, the invention thus provides a means to dynamically provision protection within the optical layer of a network without the need to interface with overlying layers of the network, and enables new working paths to be provided with protection paths as required. A probe signal may be sent either on demand or periodically to determine the efficiency of the protection paths offered if the bandwidth is dedicated completely for client signal failure events.

In the case where a SONET/SDH client layer network is supported, the network control can thus be informed whenever the optical margins are decreasing, without the SONET/SDH connection reporting errored bits. The network control is able to confirm the location of the degradation by correlating reports from individual connections and comparing this information with topology information of the network. Advantageously when the client layer has no protection mechanism built in the methods described may be employed to provide protection.

Optical protection can be provisioned dynamically in response to protection falling below a first level, and can be retained regardless of whether performance levels shift if the network operator so desires. In this way, even if performance levels initially remain static or rise, if degradation then occurs which exceeds a second threshold level, corrective action can be taken immediately by the network control to configure a second connection (a "bridge") to relieve the degrading working path and roll the service onto the new connection previously provisioned. As is known to those skilled in the art, the terms bridge and roll are used in this context to indicate a protection path being provisioned and a forced protection event initiated In summary, the invention thus provides an optical network capable of adapting to changing optical margins when connections are set up in the optical network, and will be particularly advantageous whenever simple, scalable wavelength connection set-up algorithms are to be provided. The network control is able to monitor whenever a new wavelength connection is set-up to determine if there is a correlation between the new wavelength and any subsequent optical degradation in neighbouring wavelength channels in the WDM signal.

Advantageously, the invention enables high levels of service to be provided even where no intrinsic protection is provided, even for alien wavelengths where the network operator has no control over the client layer terminal equipment.

Advantageously, the network does not need to provide a large amount of dedicated protection bandwidth, as bandwidth for ensuring availability may be time shared between the many channels in the network, as multiple spatially diverse failure events are rare in communication networks.

The invention claimed is:

1. A method for triggering an optical protection event in an optical layer of a network comprising the following steps:
   i) monitoring the optical performance of an optical signal transmitted within the optical layer of the network;
   ii) provisioning optical protection in the event the monitored optical performance falls below a first threshold level; and
   iii) triggering an optical protection event, in the event the monitored optical performance falls further to below a second threshold level,
   wherein the monitoring step is performed within the optical layer of the network by using a proxy to determine an optical performance characteristic which corresponds to the transmission quality of electronic signals extracted from said optical layer signal.

2. A method as claimed in claim 1, wherein the optical performance characteristic is derived from the Q value acquired at the source and destination nodes of said optical signal.

3. A method as claimed in claim 1, wherein the optical performance characteristic is derived from the Q value acquired between pairs of nodes along the transmission path of said optical signal.

4. A method as claimed in claim 1, wherein said first threshold level of said optical performance is set such that the transmission quality of electronic signals extracted from said optical layer signal is not affected when said level is exceeded.

5. A method as claimed in claim 1, wherein said second threshold level of said optical performance is set such that the transmission quality of electronic signals extracted from said optical layer signal is about to be affected when said level is exceeded.

6. A method as claimed in claim 1 and comprising the steps of:
   i) carrying out the monitoring at a first location,
   ii) generating a first alarm in the event that the optical performance falls below the first threshold to alert a network control of said network,
   iii) monitoring at a second location up stream of the first location, the optical performance of the same optical signal, and
   iv) comparing the optical performance at the first and second locations to determine whether the degradation begins upstream or downstream of the second location.

7. A method as claimed in claim 6, wherein said network control comprises a network operator.

8. A method as claimed in claim 6, wherein said network control comprises an autonomous network controller.

9. A method as claimed in claim 6, further comprising the step of
   iii) using said network control to carry out the provisioning of optical protection and wherein said optical protection provides end-to-end path protection.

10. A method as claimed in claim 6, further comprising the step of
    iii) using said network control for the provisioning of optical protection, and wherein said optical protection provides local link protection.

11. The method of claim 6, wherein the alarm comprises a visual alarm on a graphical display device arranged to monitor said optical layer network.

12. The method of claim 6, wherein the alarm comprises an audio alarm emitted by a suitable device to alert a network operator for said optical layer network.

13. A method as claimed in claim 1, wherein the monitoring step is performed whenever a new channel is injected into said optical layer of said communications network.

14. A protection scheme for a communications network, wherein the optical performance of an optical path in the network is indicated to network control when degradation in the performance in an optical layer of the network has occurred prior to the performance in any higher layers of said network being substantially adversely affected, the protection scheme comprising the steps of:
    i) monitoring the optical performance of an optical signal transmitted within the optical layer of the network using a proxy to determine an optical performance characteristic which corresponds to the transmission quality of electronic signals extracted from said optical layer signal;
    ii) generating a first alarm in the event that the optical performance falls below a first predetermined optical performance level to alert the network control of the network that said first predetermined optical performance level has been exceeded;
    iii) the network control provisioning optical protection in the event the monitored optical performance falls below the first threshold level; and
    iv) triggering an optical protection event, in the event the monitored optical performance falls further to below a second threshold level.

15. An optical protection system comprising a plurality of apparatus for use in a communications network, each said apparatus capable of implementing a method of indicating to network control when degradation in the performance in an optical layer of the communications network has occurred prior to the performance in any higher layers of the communications network being substantially adversely affected, each said apparatus comprising:—
    a monitor arranged to monitor the optical performance of an optical signal transmitted within the optical layer of the network using a proxy to determine an optical performance characteristic which corresponds to the transmission quality of electronic signals extracted from said optical layer signal;
    an alarm generator arranged to generate a first alarm in the event that the optical performance falls below a first predetermined optical performance level to alert the network control of the network that said first predetermined optical performance level has been exceeded;

means for said network control to provision optical protection in the event the monitored optical performance falls below the first threshold level;

an alarm generator arranged to generate a second alarm in the event that the optical performance falls below a second predetermined optical performance threshold level, said second alarm triggering an optical protection event.

16. A communications network in which the optical layer is provided with means to implement a method for triggering an optical protection event in an optical layer of a network, the implementation means comprising:

i) a monitor to monitor the optical performance of an optical signal transmitted within the optical layer of the network;

ii) optical protection provisioning means to provision optical protection in the event the monitored optical performance falls below a first threshold level; and iii) triggering means to trigger an optical protection event, in the event the monitored optical performance falls further to below a second threshold level, wherein the monitoring is performed within the optical layer of the network by using a proxy to determine an optical performance characteristic which corresponds to the transmission quality of electronic signals extracted from said optical layer signal.

* * * * *